United States Patent Office 2,789,596
Patented Apr. 23, 1957

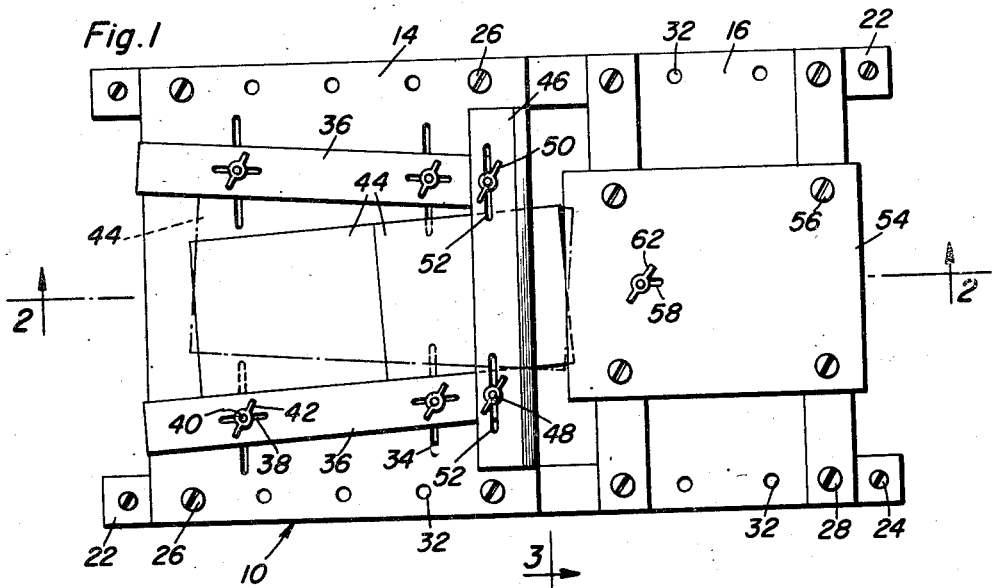
Fig. 1
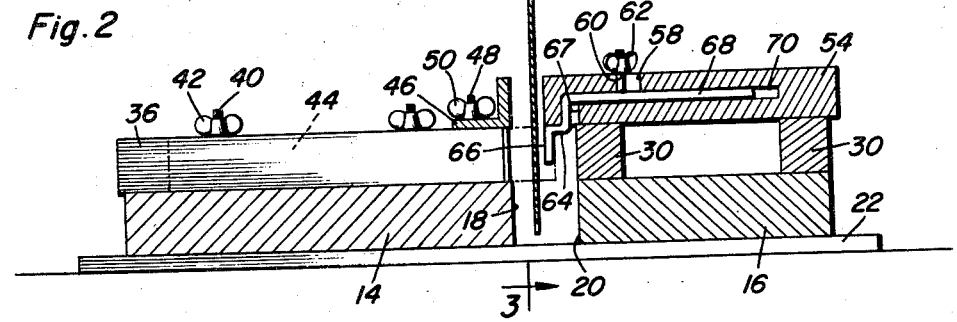
Fig. 2
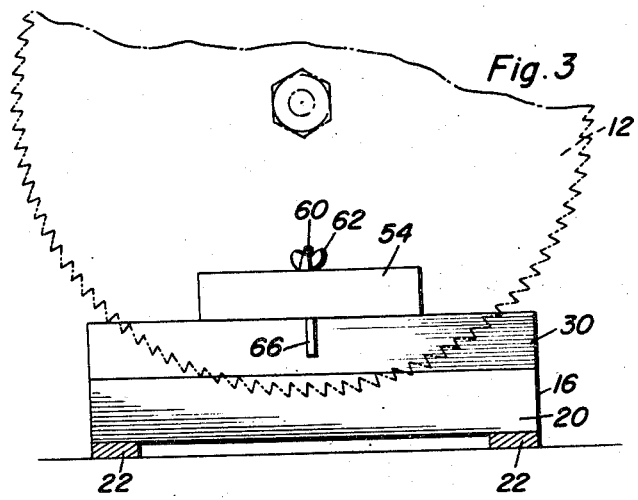
Fig. 3
Fig. 4
Oscar E. Barnes
Reno L. Barnes
       INVENTORS

2,789,596

SAFETY JIG FOR CUTTING WEDGES ON ALL MOVABLE SAWS

Oscar E. Barnes and Reno L. Barnes, Alexandria, Va.

Application March 18, 1955, Serial No. 495,172

6 Claims. (Cl. 143—169)

This invention generally relates to a wedge cutting jig, and more specifically provides a safety jig for cutting wedges on all movable type saws.

An object of the present invention is to provide a jig for use in cutting wedges which is safe in operation, adaptable for use in conjunction with all types of saws, easy to operate, efficient in use, well adapted for its intended purposes and relatively inexpensive to manufacture.

Another object of the present invention is to provide a jig for cutting wedges on movable saws wherein a wedge is cut from a piece of wood in each direction of movement of the saw, thereby permitting wedges to be cut in both the forward and rearward movement of a movable saw or when the saw moves across the jig in either direction.

A further object of the present invention is to provide a jig for cutting wedges in which the thickness of the wedges may be readily adjustable and the relative thickness of the heel and toe of the wedge may be easily adjusted thereby forming a jig for cutting wedges of any size and type.

Still another important feature of the present invention is to provide a jig for cutting wedges in which it is virtually impossible for the operator's fingers to come into contact with the saw blade and also in which the wedges are forced to be discharged downwardly through a suitable opening in the saw table, thereby eliminating the danger of accidental injury due to the saw blade and flying wedges caused by contact of the wedges with the saw as they are completely severed.

Yet another important feature of the present invention is the provision of a safety jig for cutting wedges which may be utilized on movable saws such as the radial arm type or the swing type which may operate above a saw table or may pass upwardly through the saw table during cutting movement thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the safety jig for cutting wedges of the present invention showing blocks of wood positioned therein in one position and showing the dotted line position wherein wedges may be cut from the inner end of the blocks of wood during back and forth movement of a movable saw;

Figure 2 is a longitudinal, vertical sectional view taken substantially upon a plane passing along section line 2—2 of Figure 1 showing the position of the saw as it passes through the jig and the adjustable structure of the stop pin for varying the physical characteristics of the wedge cut by the saw;

Figure 3 is a transverse, vertical sectional view taken substantially upon a plane passing along section line 3—3 of Figure 2 showing the relationship of the saw to the safety jig as it passes therethrough; and Figure 4 is a perspective view of a wedge which may be formed from the blocks of wood by the jig of the present invention.

Referring now specifically to the drawings, it will be seen that the numeral 10 generally designates the safety jig of the present invention for use in conjunction with a movable and rotating saw blade 12 wherein the saw blade 12 may move in a radial horizontal plane or may move in a vertical plane about a horizontal pivot wherein the saw normally is moved inwardly and outwardly by an operator during the cutting operation thereof.

The jig 10 generally includes a pair of base members 14 and 16 which are spaced from each other and include spaced parallel adjacent facing surfaces 18 and 20 which form a passageway for the blade 12. The base members 14 and 16 are secured together by a pair of strap members 22 which may be attached to a saw table by screw fasteners 24 at each end thereof. Also, the base member 14 may be attached to the strap 22 by screw threaded fasteners 26 at each corner thereof, and the base member 16 may be attached to the straps 22 by screw threaded fasteners 28 at each corner thereof which also extend through spacer bars 30 attached to the upper surface of the base 16 adjacent the edge 20 and adjacent the outer edge for a purpose described hereinafter. Also, the base members 14 and 16 are each provided with a plurality of apertures 32 along the longitudinal edges thereof for attaching the base members 14 and 16 directly to the saw table without the use of the strap 22 which will permit the base members 14 and 16 to be used in conjunction with a swing type saw where the saw moves upwardly in a vertical plane through the saw table wherein the bars 22 are eliminated between the adjacent edges 18 and 20 of the base members 14 and 16.

The base member 14 is provided with a plurality of transversely elongated slots 34 which are disposed in transversely aligned pairs and longitudinally aligned pairs for supporting a pair of guide rails 36 having longitudinal slots 38 adjacent each end thereof for overlying disposition in relation to the slots 34 with each under and over slot receiving a fastening member 40 extending therethrough with a wing nut 42 on the upper surface thereof wherein the guide rails 36 may be clamped in angularly adjusted position on the upper surface of the base member 14 for guiding blocks of wood 44 towards the space between the adjacent walls 18 and 20 of the base members 14 and 16. As illustrated, a pair of wooden blocks 44 are utilized wherein the rearmost wood block 44 is utilized to urge the forwardmost block 44 towards the path of movement of the saw, thereby assuring that the hand of the operator of the saw will be retained in spaced relation to the saw blade 12. By adjustably positioning the guide rails 36, the pivotal movement of the blocks of wood 44 may be regulated thereby determining the relative length, width or thickness of the toe and heel of the wedges cut by the jig.

Transversely disposed on the upper surface of the guide rails 36 adjacent the inner end thereof and overlying the inner edge 18 of the base member 14 is a safety rail 46 secured to the guide rails 36 by fastening members 48 each having a wing nut 50 on the upper end thereof, and the fastening members 48 are disposed in elongated slots 52 for permitting adjustment of the guide rails 36 in relation to the safety rail 46. The safety rail 46 prevents the operator's fingers from passing into the path of movement of the saw blade 12 while pushing the blocks of wood 44 towards the same. This safety rail 46 acts as a stop for the operator's hand, thereby eliminating possible injury due to the operator's fingers or hand being disposed in the path of movement of the rotating saw blade 12.

Disposed centrally on the upper surface of the spacing rails or members 30 is a central plate 54 secured to the upper surface of the spacers 30 by fastening members 56. The inner edge of the central plate 54 projects beyond the inner edge 20 of the base 16 and the inner edge of the inner spacing member 30 thereby providing an overhanging portion adjacent the path of movement of the saw 12. The central plate 54 is provided with a slot 58 adjustably receiving a vertical pin 60 projecting upwardly from rod 68 and having a wing nut 62 on the upper end thereof for clamping engagement with the central plate 54. A horizontal offset portion 64 at the inner end of rod 68 terminates in a depending vertical portion 66 which forms a stop pin for the central portion of the block of wood 44 and is slidable by virtue of slot 67. The vertical portion 66 forms a stop pin and also forms a pivot point for the block of wood 44 wherein the block of wood 44 may be moved from a position against one of the guide rails 36 to a position against the other of the guide rails 36 whereby a wedge will be cut from the inner end of the block of wood 44 during each direction of movement of the saw blade 12. The elongated rigid guide rod 68 is slidably received in a bore 70 in the plate 54 thereby retaining the offset portion 64 and the vertical portion 66 of the pin 60 in proper orientation for engagement with the inner end of the block of wood 44. The vertical portion 66 will not at any time project beyond the inner edge of the central plate 54 thereby preventing contact of the saw 12 therewith. By adjusting the longitudinal position of the pin 60, the thickness of the wedges cut by the saw 12 may be varied, and by adjustment of the guide rails 36, the relative thickness of the heel and toe of the wedges may be adjusted or varied as desired. The overhanging portion of the central plate 54 prevents the wedges from moving upwardly through the jig 10, thereby assuring that the wedges 72 will fall downwardly through a suitable opening in the saw table. The member 46 may be faced with wood to prevent damage to the saw and also forms a guide surface together with plate 54 for the usual saw guide. As illustrated in Figure 4, the wedge 72 is provided with a very thin toe 74 and a relatively thicker heel 76.

In operation, the blocks 44 are disposed against one of the guide rails 36 and moved inwardly into contact with the vertical portion 66 and the saw blade 12 moved through and between the spaced surfaces 18 and 20 for cutting a wedge 72 from the inner end of the block 44. After the blade 12 has been moved in one direction, the wood blocks 44 are then moved to a position against the other guide rail 36 and still in contact with the vertical portion 66 wherein the blade 12 may be moved back through the area formed by the spaced surfaces 18 and 20 for cutting another wedge 72 therefrom. Accordingly, it will be seen that a wedge 72 is cut from the block of wood 44 each time the saw blade 12 is moved through the safety jig 10 of the invention. Obviously, the device may be constructed of any suitable material which is relatively light, corrosive-proof and inexpensive.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A jig for cutting wedges with a movable saw table-saw machine comprising a guide member on one side of the path of movement of the saw, guiding and permitting limited pivotal movement of a wood block, and a pin on the other side of the path of movement of the saw engaging the central portion of the end of the block whereby the saw will cut a wedge from the end of the block in each direction of movement thereof when the block is moved into engagement with the pin and pivoted sequentially in said guide member, said guide member including a flat base adapted to be attached to the saw table, a pair of horizontally spaced converging guide rails on the upper surface of said base for limiting the pivotal movement of a block, and a transverse member at the end of said rails on the upper surface thereof adjacent the path of movement of the saw thereby preventing the positioning of fingers in the saw path.

2. The combination of claim 1 wherein said guide rails are adjustably secured to said base with a bolt and slot connection thereby providing for varying the thickness of the heel and toe of the wedges and permitting wedges of varying lengths to be cut.

3. A jig for cutting wedges with a movable saw table-saw machine comprising a guide member on one side of the path of movement of the saw, guiding and permitting limited pivotal movement of a wood block, and a pin on the other side of the path of movement of the saw engaging the central portion of the end of the block whereby the saw will cut a wedge from the end of the block in each direction of movement thereof when the block is moved into engagement with the pin and pivoted sequentially in said guide member, a flat base adapted to be attached to the saw table, said base having a mounting plate upon it forming an overhanging portion adjacent the path of movement of the saw on said other side of the saw, said pin being adjustably mounted in and depending from the overhanging portion for cutting wedges of varying thicknesses, said overhanging portion preventing the wedges from flying upwardly when they are cut.

4. The combination of claim 3 wherein said pin includes an offset portion for disposition adjacent the path of movement for cutting thin wedges.

5. A jig for cutting wedges with a movable saw table-saw machine comprising a guide member on one side of the path of movement of the saw, guiding and permitting limited pivotal movement of a wood block, and a pin on the other side of the path of movement of the saw engaging the central portion of the end of the block whereby the saw will cut a wedge from the end of the block in each direction of movement thereof when the block is moved into engagement with the pin and pivoted sequentially in said guide member, said guide member including a flat base adapted to be attached to the saw table, a pair of spaced converging guide rails on the upper surface of said base for said limiting the pivotal movement of a block, and a transverse member at the end of said rails on the upper surface thereof adjacent the path of movement of the saw thereby preventing the positioning of fingers in the saw path, a base adapted to be attached to the saw table on said other side of the saw, said base having a mounting plate upon it forming an overhanging portion adjacent the path of movement of the saw, said pin being adjustably mounted in and depending from the overhanging portion for cutting wedges of varying thicknesses, said overhanging portion preventing the wedges from flying upwardly when they are cut, said base members being connected by straps across the bottoms thereof for retaining the base members in correct relative position.

6. A safety jig for cutting wedges on a table-saw machine having relative movement between the saw table and the saw blade, said jig comprising a pair of generally flat base members disposed in spaced relation for permitting passage of the saw blade therebetween, said base members adapted to be attached to the saw table, one of said base members having upstanding guide rails mounted on the upper surface of the base, said guide rails converging towards the path of movement of the saw blade, the other of said base members being disposed on the opposite side of the path of movement of the saw blade and having a stop member thereon, said guide rails receiving a block of wood therebetween, said stop member presenting a contact point for engaging the end of the block of wood substantially at the center thereof whereby the saw blade will cut a wedge from the end of the block of wood each time the saw blade and block move past each other when the block is moved into engagement with the stop member and pivoted sequentially from guide rail to guide rail about the point of contact between the block of wood and the stop member.

References Cited in the file of this patent

UNITED STATES PATENTS

| | | |
|---|---|---|
| 269,272 | Emerick | Dec. 19, 1882 |
| 702,043 | Zika | June 10, 1902 |
| 1,547,604 | Miner | July 28, 1925 |
| 2,054,218 | Gilmore | Sept. 15, 1936 |
| 2,183,479 | Jenkins | Dec. 12, 1939 |

FOREIGN PATENTS

| | | |
|---|---|---|
| 454,851 | Great Britain | Oct. 5, 1936 |